US012608517B2

(12) United States Patent
Liu et al.

(10) Patent No.: US 12,608,517 B2
(45) Date of Patent: Apr. 21, 2026

(54) SIMULATION METHOD FOR THREE-DIMENSIONAL FULL-SPACE PLASMA RESPONSE IN EAST TOKAMAK

(71) Applicant: DALIAN UNIVERSITY OF TECHNOLOGY, Dalian (CN)

(72) Inventors: Tong Liu, Dalian (CN); Zhengxiong Wang, Dalian (CN); Feng Wang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 1001 days.

(21) Appl. No.: 17/780,326

(22) PCT Filed: Jan. 4, 2022

(86) PCT No.: PCT/CN2022/070014
§ 371 (c)(1),
(2) Date: May 26, 2022

(87) PCT Pub. No.: WO2022/148333
PCT Pub. Date: Jul. 14, 2022

(65) Prior Publication Data
US 2023/0177233 A1 Jun. 8, 2023

(30) Foreign Application Priority Data

Jan. 11, 2021 (CN) .......................... 202110032259.4

(51) Int. Cl.
*G06F 30/20* (2020.01)
*G06F 17/12* (2006.01)
(Continued)

(52) U.S. Cl.
CPC .............. *G06F 30/20* (2020.01); *G06F 17/12* (2013.01); *G06F 2111/10* (2020.01); *G21B 1/057* (2013.01)

(58) Field of Classification Search
None
See application file for complete search history.

(56) References Cited

U.S. PATENT DOCUMENTS

| 2018/0076911 | A1* | 3/2018 | Taniguchi | ............ | H04B 17/345 |
| 2019/0369285 | A1* | 12/2019 | Fouda | ...................... | G01V 3/10 |
| 2020/0265847 | A1* | 8/2020 | Schnell | ................... | G10L 25/45 |

FOREIGN PATENT DOCUMENTS

CN 110232205 A 9/2019

OTHER PUBLICATIONS

Haverkort et al, "Implementation of the Full Viscoresistive Magnetohydrodynamic Equations in a Nonlinear Finite Element Code", Journal of Computational Physics 316 (2016), pp. 281-302 (Year: 2016).*

(Continued)

*Primary Examiner* — Rehana Perveen
(74) *Attorney, Agent, or Firm* — MUNCY, GEISSLER, OLDS & LOWE, P.C.

(57) ABSTRACT

The present invention discloses a simulation method for three-dimensional full-space plasma response in EAST tokamak. In numerical simulation of plasma response in an EAST tokamak device, firstly, single frequency waves with different frequencies and amplitudes are selected according to experiment needs, to design waveforms of an external perturbation current field; then selected single frequency current field waveforms are respectively used as driving terms to solve magnetohydrodynamic equations containing an external driving current field to solve the distribution of the single frequency magnetic response signals in a three-dimensional full space; and finally, multiple groups of the single frequency magnetic response signals are superimposed and converted into a time domain space to obtain the three-dimensional full-space distribution of plasma magnetic response signals at any time. The present invention (Continued)

Designing external perturbation current fields $\delta J_1, \delta j_2...\delta j_n$ according to experimental needs Solving magnetohydrodynamic equations comprising external driving terms by using external perturbation current $\delta J_1$ to obtain magnetic response $\delta B_j$ Replacing the external perturbation current with $\delta j_2...\delta j_n$ and repeating the previous step for repeated solving to obtain magnetic responses $\delta B_2...\delta B_n$ Converting each single frequency magnetic response signal from a frequency domain space into a time domain space, and superimposing the signals together to obtain the three-dimensional full-space magnetic response $\delta B_t = \delta B_{1t} + \delta B_{2t}... + \delta B_{nt}$ at any time realizes the corresponding full-space distribution of plasma at any time in the process of simulating EAST tokamak discharge experiments, and makes up for the deficiency that the distribution of full-space magnetic signals cannot be obtained by experimental measurement. The present invention has accurate simulation results and strong practicality, and is a stable and efficient numerical simulation method.

1 Claim, 2 Drawing Sheets

(51) Int. Cl.
  *G06F 111/10*          (2020.01)
  *G21B 1/05*            (2006.01)

(56)                    References Cited

OTHER PUBLICATIONS

Ambrosino et al, "Magnetic Control of Plasma Current, Position, and Shape in Tokamaks", IEEE Control Systems Magazine, Oct. 2005, pp. 76-92 (Year: 2005).*
Logan et al, "Magnetic Polarization Measurements of the Multi-Modal Plasma Response to 3D Fields in the East Tokamak", Nuclear Fusion 58 076016, May 31, 2018, pp. 1-12 (Year: 2018).*
Chen et al. "Disruptive Plasma Simulations in East including 3D Effects", Nuclear Fusion 59 106039, Sep. 9, 2019, pp. 1-14 (Year: 2019).*
Coutlis et al, "Frequency Response identification of the Dynamics of a Tokamak Plasma", Jul. 2000, IEEE vol. 8 No. 4, pp. 646-659. (Year: 2000).*

* cited by examiner

Plasma boundary

Plasma

External current coil

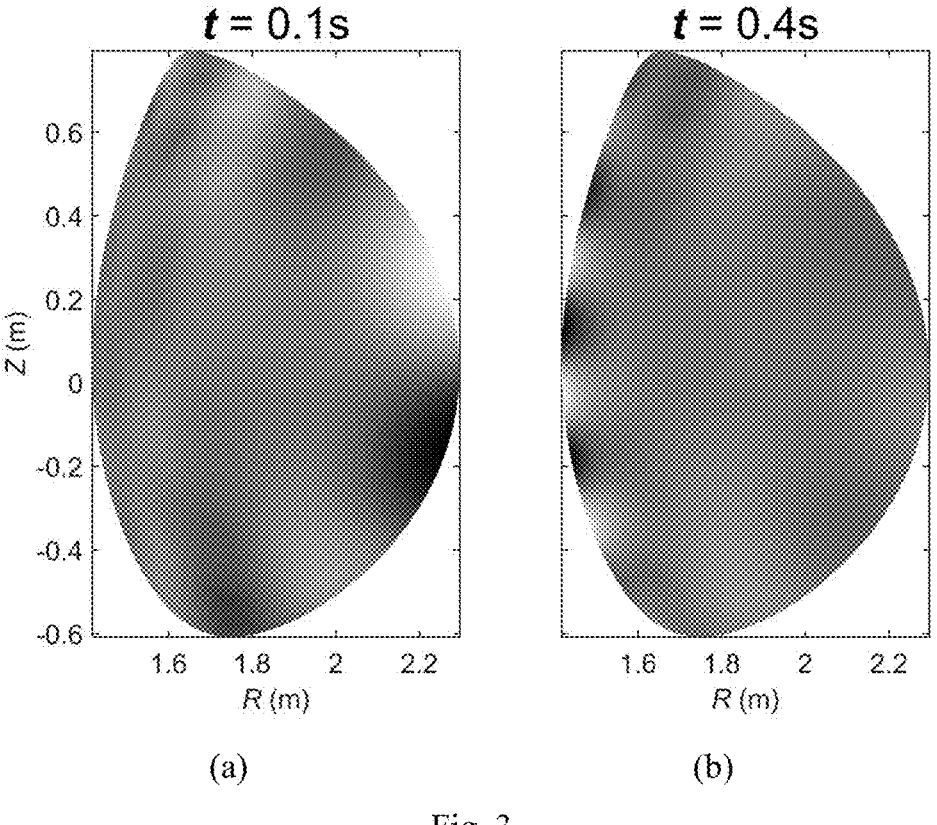

Designing external perturbation current fields $\delta J_1$, $\delta j_2$...$\delta j_n$ according to experimental needs

Solving magnetohydrodynamic equations comprising external driving terms by using external perturbation current $\delta J_i$ to obtain magnetic response $\delta B_i$

Replacing the external perturbation current with $\delta j_2$...$\delta j_n$ and repeating the previous step for repeated solving to obtain magnetic responses $\delta B_2$...$\delta B_n$

Converting each single frequency magnetic response signal from a frequency domain space into a time domain space, and superimposing the signals together to obtain the three-dimensional full-space magnetic response $\delta B_t = \delta B_{1t} + \delta B_{2t}$ ...$+\delta B_{nt}$ at any time

Fig. 4

SIMULATION METHOD FOR THREE-DIMENSIONAL FULL-SPACE PLASMA RESPONSE IN EAST TOKAMAK

TECHNICAL FIELD

The present invention relates to numerical simulation of a tokamak device in the field of magnetically controlled fusion, and particularly relates to a simulation method for three-dimensional full-space plasma response in EAST toka-mak experimental discharge process.

BACKGROUND

Controlled fusion is an ultimate permanent solution to solve the energy problem. The most promising solution of multiple controlled fusion solutions is the magnetic confinement method. As the most promising device in magnetically controlled fusion, tokamak is favored by researchers, EAST tokamak in Hefei, Anhui province is a full superconducting tokamak device operated in China currently. All parameters of the EAST device are at the forefront of the world. In the tokamak discharge experimental process, to detect a plasma state, the plasma response needs to be excited by an external perturbation current field, and the plasma state is judged by analyzing the plasma response.

At present, plasma magnetic response signals are generally measured by a low field side magnetic probe array on the EAST tokamak device. However, only the outermost magnetic perturbation signal can be obtained by an experimental measurement means, and magnetic signals of plasma core cannot be obtained by the experimental means currently. To obtain the three-dimensional full-space magnetic response distribution of the plasma core and obtain the plasma state information more intuitively, a simulation method used with experiments urgently needed. The method proposed in the present invention can just satisfy this need. In the method, a current signal applied in an external coil on an experiment is directly used as an input parameter for numerical simulation. Firstly, linear equations are solved in the frequency domain space, and then the information in the frequency domain space is converted into a time domain space. The method has high computational efficiency, small numerical error, good convergence and strong numerical stability, and is an accurate and efficient numerical simulation method.

SUMMARY

The invention purpose of the present invention is to realize the numerical simulation of three-dimensional full-space plasma magnetic response signals in EAST tokamak discharge experiments, to make up for the deficiency that a magnetic probe array can only measure the magnetic response signals at limited positions.

The technical solution of the present invention is as follows:

A simulation method for three-dimensional full-space plasma response in EAST Tokamak is provided. A disturbance current signal applied in an external coil of an EAST tokamak device is directly used as input information to solve single frequency three-dimensional full-space plasma magnetic response signals, and finally, the magnetic signals in a frequency domain space are converted into a time domain space and superimposed together to ultimately obtain the distribution of the magnetic response signals in a three-dimensional full space at any time. The method has high calculation efficiency and accurate numerical results, and specifically comprises the following steps:

Step 1: according to the cross-section shape of EAST tokamak, meshing a core high-temperature plasma area in an experiment, and storing physical quantity involved in a computational process through nodes obtained by meshing.

Step 2: designing a waveform of an external perturbation current field $\delta J$ according to experimental needs, wherein $\delta J$ is generally formed by superimposing a group of perturbation current with different frequencies and amplitudes, i.e., $\delta J = \delta J_1 + \delta J_2 + \ldots + \delta J_n$.

Step 3: measuring initial equilibrium information (intensity of pressure $P_0$, magnetic field $B_0$ and current $J_0$) by using a diagnostic device on an EAST device and storing in the mesh nodes.

Step 4: storing an external perturbation current signal $\delta J_1$ applied in step 2 into a mesh node in a position corresponding to the external coil.

Step 5: solving linearized magnetohydrodynamic equations comprising external driving terms and obtaining a magnetic response signal $\delta B_1$.

The equations solved here are:

$$i\omega\rho v_1 = -\nabla P_1 + (j_1 + \delta J_1) \times B_0 + J_0 \times \delta B_1$$

$$i\omega \delta B_1 = \nabla \times (v_1 \times B_0)$$

$$i\omega P_1 = -v_1 \cdot \nabla P_0 - \Gamma P_0 \nabla \cdot v_1$$

$$j_1 + \delta J_1 = \nabla \times \delta B_1$$

where i is an imaginary number symbol; $\Gamma$ is an adiabatic coefficient; $\omega$ is the frequency of an external perturbation current field $\delta J_1$; $\rho$ is plasma density; $P_1$ is intensity of pressure of perturbation; $j_1$ is perturbation current density; $v_1$ is perturbation velocity; and $\delta B_1$ is the plasma magnetic response signals to be solved.

Step 6: replacing the external perturbation current signal $\delta J_1$ in step 4 with $\delta J_2 \ldots \delta J_n$ and repeating step 4 and step 5 for several times until all single frequency magnetic response signals $\delta B_1 \ldots \delta B_n$ are obtained.

Step 7: converting the magnetic response signals $\delta B_1 \ldots \delta B_n$, in the frequency domain space into the time domain space, and superimposing the signals together to obtain the three-dimensional full-space plasma magnetic response signal $\delta B_t = \delta B_{1t} + \delta B_{2t} + \ldots + \delta B_{nt}$ at any time.

The beneficial effects of the present invention: the present invention realizes the simulation of the three-dimensional full-space plasma magnetic response signals in discharge experiments of the EAST tokamak device, and makes up for the deficiency that the outermost magnetic response signal can only be obtained by an experimental measurement means. At the same time, a single frequency linear model is used for numerical simulation. Finally, the response signals are converted into the time domain space, so that the numerical processing accuracy is higher, and the magnetic response signals at any time can be obtained. The method has high calculation efficiency and good convergence, and is an efficient and stable numerical simulation method.

DESCRIPTION OF DRAWINGS

FIG. 3 shows numerical results of simulating three-dimensional full-space plasma magnetic response signals on EAST tokamak in the present invention.

FIG. 4 is a main flow chart for simulation of calculation of three-dimensional full-space plasma response in the present invention.

DETAILED DESCRIPTION

Figures 1, 2:
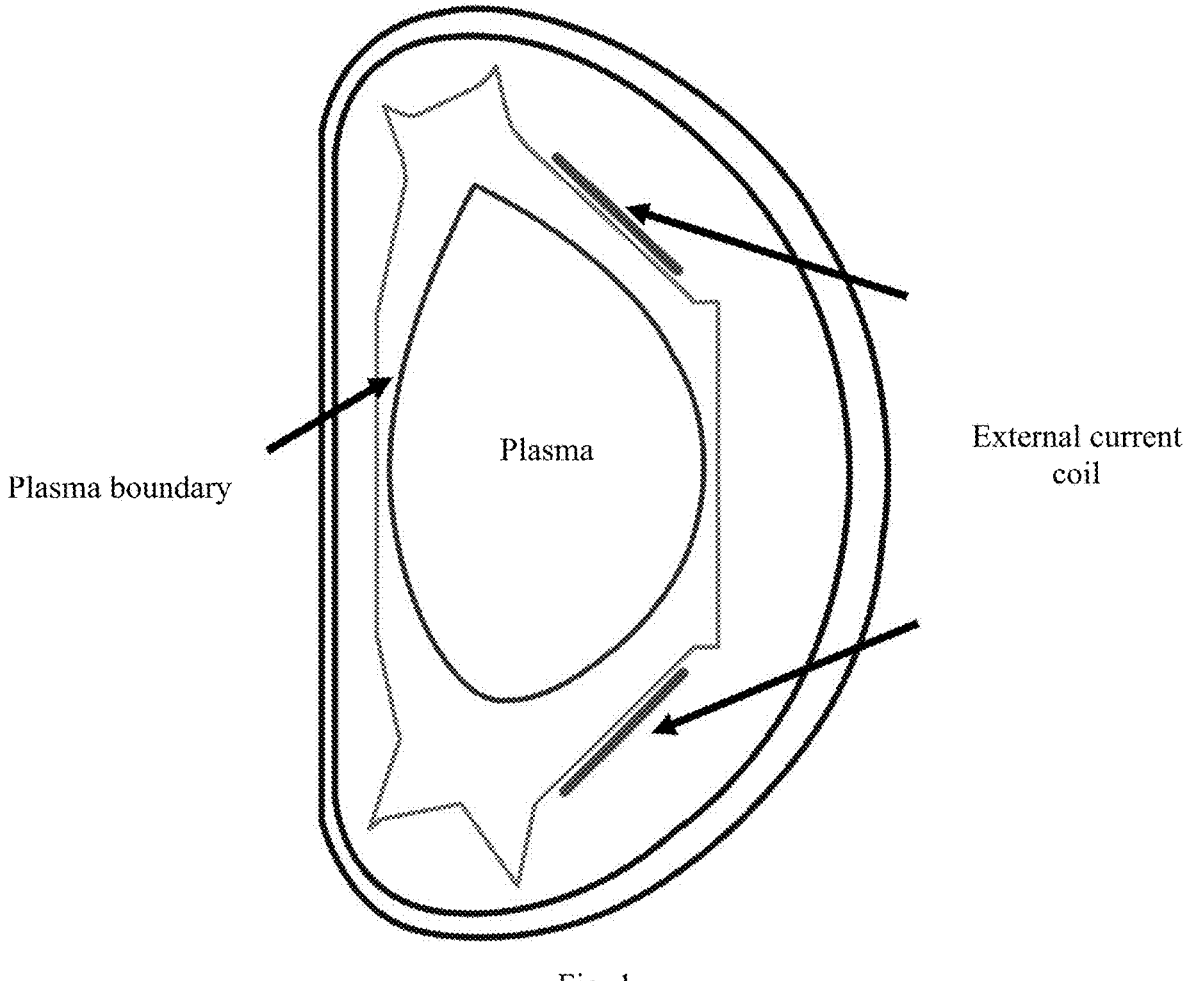
FIG. 1 is a cross section schematic diagram of an EAST tokamak device applicable to the present invention.
FIG. 2 shows an external perturbation current field waveform adopted for simulation of calculation in the present invention.

Specific embodiments of the present invention are further described below in combination with the drawings and the technical solution.

An EAST tokamak device has a cross-sectional shape as shown in FIG. 1. Two groups of upper and lower external coils are installed on the device to generate an external perturbation current field. A core plasma area is meshed according to an EAST geometry configuration shown in FIG. 1. Before an EAST tokamak discharge experiment, an external perturbation current field waveform shall be designed at first. The present embodiment uses a relatively universal waveform, as shown in FIG. 2. The perturbation current waveform is formed by superimposing single frequency waves with frequencies of 2 Hz, 5 Hz, 10 Hz, 30 Hz, 100 Hz and 150 Hz. Initial equilibrium parameters use general parameters in the EAST discharge experiment, and the equilibrium parameters are stored in the divided meshes. The perturbation current field waveform is applied for numerical simulation. By substituting the above six single frequency current waveforms into magnetohydrodynamic equations containing external driving terms, the plasma magnetic response signals are solved to obtain six single frequency magnetic response signals. Then, the magnetic response signals in the frequency domain space are converted into the time domain space, and superimposed together to obtain the three-dimensional full-space distribution of the plasma magnetic response at any time. As shown in FIG. 3, the figure shows the distribution of the plasma magnetic response signals in the cross section at time t=0.1 s and t=0.4 s in the present embodiment.

Specific implementation steps are as follows:

Step 1: according to the cross-section shape of EAST tokamak, meshing a core high-temperature plasma area in an experiment, and storing physical quantity involved in a computational process through nodes obtained by meshing.

Step 2: designing a waveform of an external perturbation current field $\delta J$ according to experimental needs, wherein $\delta J$ is generally formed by superimposing a group of perturbation current with different frequencies and amplitudes, i.e., $\delta J = \delta J_1 + \delta J_2 + \ldots + \delta J_n$.

Step 3: measuring initial equilibrium information (intensity of pressure $P_0$, magnetic field $B_0$ and current $J_0$) by using a diagnostic device on an EAST device and storing in the mesh nodes.

Step 4: storing an external perturbation current signal $\delta J_1$ applied in step 2 into a mesh node in a position corresponding to the external coil.

Step 5: solving linearized magnetohydrodynamic equations comprising external driving terms and obtaining a magnetic response signal $\delta B_1$.

The equations solved here are:

$$i\omega\rho v_1 = -\nabla P_1 + (j_1 + \delta J_1) \times B_0 + J_0 \times \delta B_1$$

$$i\omega\delta B_1 = \nabla \times (v_1 \times B_0)$$

$$i\omega P_1 = -v_1 \cdot \nabla P_0 - \Gamma P_0 \nabla \cdot v_1$$

$$j_1 + \delta J_1 = \nabla \times \delta B_1$$

where i is an imaginary number symbol; $\Gamma$ is an adiabatic coefficient; $\omega$ is the frequency of an external perturbation current field $\delta J_1$; $\rho$ is plasma density; $P_1$ is intensity of pressure of perturbation; $j_1$ is perturbation current density; $v_1$ is perturbation velocity; and $\delta B_1$ is the plasma magnetic response signals to be solved.

Step 6: replacing the external perturbation current signal $\delta J_1$ in step 4 with $\delta J_2 \ldots \delta J_n$ and repeating step 4 and step 5 for several times until all single frequency magnetic response signals $\delta B_1 \ldots \delta B_n$ are obtained.

Step 7: converting the magnetic response signals $\delta B_1 \ldots \delta B_n$ in the frequency domain space into the time domain space, and superimposing the signals together to obtain the three-dimensional full-space plasma magnetic response signal $\delta B_t = \delta B_{1t} + \delta B_{2t} + \ldots + \delta B_{nt}$ at any time.

The above contents are further detailed descriptions of the present invention in combination with preferred technical solutions. The specific implementation of the present invention shall not be considered to be only limited to these descriptions. For those ordinary skilled in the art to which the present invention belongs, several simple deductions and replacements may be made without departing from the conception of the present invention, all of which shall be considered to belong to the protection scope of the present invention.

The invention claimed is:

1. A simulation method for three-dimensional full-space plasma response in EAST Tokamak, wherein a disturbance current signal applied in an external coil of an EAST tokamak device is directly used as input information to solve single frequency three-dimensional full-space plasma magnetic response signals, and finally, the magnetic signals in a frequency domain space are converted into a time domain space and superimposed together to ultimately obtain the distribution of the magnetic response signals in a three-dimensional full space at any time; the simulation method comprises the following steps:

step 1: according to the cross-section shape of EAST tokamak, meshing a core high-temperature plasma area in an experiment, and storing physical quantity involved in a computational process through mesh nodes obtained by meshing;

step 2: designing a waveform of an external perturbation current field $oJ$ according to experimental needs, wherein $oJ$ is formed by superimposing a group of perturbation current with different frequencies and amplitudes, i.e., $oJ = oJ_1 + oJ_2 + \ldots + oJ_n$;

step 3: measuring initial equilibrium information: intensity of pressure $P_0$, magnetic field $B_0$ and current $J_0$ by using a diagnostic device on an EAST device and storing in the mesh nodes;

step 4: storing an external perturbation current signal $oJ_1$ applied in step 2 into a mesh node in a position corresponding to the external coil;

step 5: solving linearized magnetohydrodynamic equations comprising external driving terms and obtaining a magnetic response signal $oB_1$;

the solved equations are:

$$wpv_1 = -\nabla P_1 + (j_1 + oJ_1) \times B_0 + J_0 \times oB_1$$

$$woB_1 = \nabla \times (v_1 \times B_0)$$

$$wP_1 = -v_1 \cdot \nabla P_0 - I \ P_0 \nabla \cdot v_1$$

where is an imaginary number symbol; I' is an adiabatic coefficient; w is the frequency of an external perturbation current field $oJ_1$; p is plasma density; $P_1$ is intensity of pressure of perturbation; $j_1$ is perturbation current density; $v_1$ is perturbation velocity; and $oB_1$ is the plasma magnetic response signals to be solved;

step 6: replacing the external perturbation current signal $oJ_1$ in step 4 with $oJ_2 \ldots oJ_n$ and repeating step 4 and step 5 for several times until all single frequency magnetic response signals $oB_1 \ldots oB_n$ are obtained; and step 7: converting the magnetic response signals $oB_1 \ldots oB_n$ in the frequency domain space into the time domain space, and superimposing the signals together to obtain the three-dimensional full-space plasma magnetic response signal $oB_t = oB_{1t} + oB_{2t} + \ldots + oB_{nt}$ at any time.

\* \* \* \* \*